United States Patent
Ahn et al.

(10) Patent No.: US 10,892,519 B2
(45) Date of Patent: Jan. 12, 2021

(54) SOLID POLYMER ELECTROLYTE AND METHOD OF PREPARING THE SAME

(71) Applicant: LG Chem, Ltd., Seoul (KR)

(72) Inventors: Kyoung Ho Ahn, Daejeon (KR); Sol Ji Park, Daejeon (KR); Chul Haeng Lee, Daejeon (KR); Jeong Woo Oh, Daejeon (KR); Jung Hoon Lee, Daejeon (KR); Yi Jin Jung, Daejeon (KR)

(73) Assignee: LG Chem, Ltd.

( * ) Notice: Subject to any disclaimer, the term of this patent is extended or adjusted under 35 U.S.C. 154(b) by 19 days.

(21) Appl. No.: 15/759,650

(22) PCT Filed: Mar. 30, 2017

(86) PCT No.: PCT/KR2017/003494
§ 371 (c)(1),
(2) Date: Mar. 13, 2018

(87) PCT Pub. No.: WO2017/171436
PCT Pub. Date: Oct. 5, 2017

(65) Prior Publication Data
US 2018/0254523 A1 Sep. 6, 2018

(30) Foreign Application Priority Data

Mar. 30, 2016 (KR) .................. 10-2016-0038570

(51) Int. Cl.
*H01M 10/0565* (2010.01)
*H01M 10/0525* (2010.01)
*H01M 10/056* (2010.01)

(52) U.S. Cl.
CPC ..... *H01M 10/0565* (2013.01); *H01M 10/056* (2013.01); *H01M 10/0525* (2013.01);
(Continued)

(58) Field of Classification Search
CPC ......... H01M 10/0565; H01M 10/0525; H01M 10/056; H01M 2300/0085; H01M 2300/0091

See application file for complete search history.

(56) References Cited

U.S. PATENT DOCUMENTS

| 5,436,090 A | 7/1995 | Kono et al. |
| 2006/0008700 A1 | 1/2006 | Yong et al. |

(Continued)

FOREIGN PATENT DOCUMENTS

| CN | 104466241 A | 3/2015 |
| EP | 2396848 B1 | 11/2014 |

(Continued)

OTHER PUBLICATIONS

Polymers: A Property Database 2018, see Tensile (Youngs) Modulus Value cited from [1, 2, 4, 5] references, which have been cited with publication years at the bottom of the document. (Year: 1995).*

(Continued)

*Primary Examiner* — Christopher P Domone
*Assistant Examiner* — Kimberly Wyluda
(74) *Attorney, Agent, or Firm* — Lerner, David, Littenberg, Krumholz & Mentlik, LLP

(57) ABSTRACT

The present invention relates to a solid polymer electrolyte formed of a polymer matrix including a lithium ion conductor, and a method of preparing the same. The solid polymer electrolyte of the present invention can be molded in the form of a film and used in an electrochemical device such as a lithium polymer secondary battery or the like.

14 Claims, 2 Drawing Sheets

(52) U.S. Cl.
CPC ............... *H01M 2300/0085* (2013.01); *H01M 2300/0091* (2013.01)

(56) References Cited

U.S. PATENT DOCUMENTS

| | | | | |
|---|---|---|---|---|
| 2008/0292968 | A1* | 11/2008 | Lee | H01M 2/14 |
| | | | | 429/247 |
| 2009/0136830 | A1* | 5/2009 | Gordon | H01M 10/052 |
| | | | | 429/50 |
| 2010/0056753 | A1 | 3/2010 | Nelles et al. | |
| 2012/0189910 | A1* | 7/2012 | Brune | C08G 81/025 |
| | | | | 429/189 |
| 2013/0000110 | A1* | 1/2013 | Takeda | H01M 2/021 |
| | | | | 29/623.1 |
| 2014/0178775 | A1 | 6/2014 | Lee et al. | |
| 2014/0272597 | A1* | 9/2014 | Mikhaylik | H01M 4/0402 |
| | | | | 429/233 |
| 2015/0244025 | A1 | 8/2015 | Rhee et al. | |
| 2017/0275399 | A1* | 9/2017 | Savoie | C08F 30/06 |

FOREIGN PATENT DOCUMENTS

| | | |
|---|---|---|
| JP | H03171567 A | 7/1991 |
| JP | 2008503049 A | 1/2008 |
| JP | 2008130529 A | 6/2008 |
| KR | 20060021222 A | 3/2006 |
| KR | 101028970 B1 | 4/2011 |
| KR | 20140091089 A | 7/2014 |
| KR | 20150061538 A | 6/2015 |
| KR | 20150101235 A | 9/2015 |

OTHER PUBLICATIONS

Mindemark, J., Imholt, L., Montero, J., & Brandell, D. ( Mar. 6, 2016). Allyl ethers as combined plasticizing and crosslinkable side groups in polycarbonate-based polymer electrolytes for solid-state Li batteries. Journal of Polymer Science Part A: Polymer Chemistry. doi: 10.1002/pola.28080 (Year: 2016).*

Extended European Search Report including Written Opinion for Application No. EP17775860.4 dated May 30, 2018.

Search report from International Application No. PCT/KR2017/003494, dated Jul. 10, 2017.

Chinese Search Report for Application No. CN201780003280.3 dated Jul. 31, 2020, 2 pgs.

* cited by examiner

SOLID POLYMER ELECTROLYTE AND METHOD OF PREPARING THE SAME

CROSS-REFERENCE TO RELATED APPLICATIONS

The present application is a national phase entry under § 371 of International Application No. PCT/KR2017/003494 filed Mar. 30, 2017, which claims priority from Korean Patent Application No. 10-2016-0038570, filed on Mar. 30, 2016, the disclosure of which is incorporated herein by reference.

TECHNICAL FIELD

The present invention relates to a solid polymer electrolyte and a method of preparing the same, and specifically to a solid polymer electrolyte formed of a polymer matrix including a lithium ion conductor, and a method of preparing the same.

BACKGROUND ART

Much research is underway focusing on alternative energy sources and alternative power sources, that is, a method of producing electrochemical energy that can respond to soaring energy consumption and change it into more environmentally friendly consumption. Many studies have been conducted on lithium secondary batteries, which are known to have the best discharge performance in electrochemical energy.

Among these, lithium secondary batteries in which a solid polymer electrolyte formed of a polymer and a salt is used are being spotlighted in particular in order to overcome the stability issues of liquid electrolytes.

A solid polymer electrolyte includes a polymer formed of polyethylene oxide (PEO)-based, polyvinyl acetate (PVA)-based, polyethyleneimine (PEI)-based, polyvinylidene fluoride (PVDF)-based, polyacrylonitrile (PAN)-based, and polymethyl methacrylate (PMMA)-based polymers or copolymers thereof as a main component.

Further, in the case of a polyethylene oxide (PEO)-based polymer with a low molecular weight, high ion conductivity (σ) can be realized at room temperature, but there is a disadvantage in that the polymer is liquefied in the presence of a salt. To address this issue, the use of polyethylene oxide with a high molecular weight is required in the preparation of a solid polymer electrolyte. However, when polyethylene oxide with a high molecular weight is used, ion conductivity is relatively high at $10^{-4}$ S/cm at high temperatures of 60° C. or more but is lowered to $10^{-5}$ S/cm at room temperature. That is, the movement of lithium ions in the solid polymer electrolyte is caused by the segmentation movements of the polymer, and in the case of polyethylene oxide with a high molecular weight, ion conductivity is lowered because of restriction of such movement due to high crystallinity.

Accordingly, there is a need for the development of a solid polymer electrolyte through which both high ion conductivity and mechanical strength in a wide temperature range can be realized by suppressing crystallinity when polyethylene oxide is used.

PRIOR ART LITERATURE

Korea Patent No. 10-1028970
Korea Patent Application Laid-Open Publication No. 10-2015-0101235

DISCLOSURE

Technical Problem

In order to address the above-described issues, an aspect of the present invention provides a solid polymer electrolyte having improved ion conductivity and mechanical properties.

Another aspect of the present invention provides a method of preparing the solid polymer electrolyte.

Technical Solution

In order to achieve the above-described objectives, according to an embodiment of the present invention, there is provided a solid polymer electrolyte including:
a polymer represented by the following Formula 1;
a lithium salt; and
a lithium ion conductor.

[Formula 1]

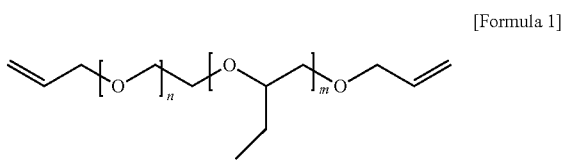

In Formula 1,
n and m represent the number of moles of a repeating unit, the molar ratio of n:m is in the range of 5:1 to 50:1, and specifically 20:1.

The weight average molecular weight (Mw) of the polymer represented by Formula 1 may be in the range of 50,000 to 1,000,000, specifically 50,000 to 500,000, and more specifically 50,000 to 200,000.

The polymer represented by Formula 1 may be included in an amount of 5 wt % to 60 wt %, and specifically 20 wt % to 60 wt %, based on the total weight of the solid polymer electrolyte.

The lithium salt may include $Li^+$ as a cation, and include one or more selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion. The lithium salt may be used alone or in combination of two or more. The lithium salt content may be suitably changed to be within a usable range in general, but may be included in an amount of 5 wt % to 20 wt % based on the total weight of the solid polymer electrolyte in order to obtain the optimum effect of forming an anti-corrosive film on an electrode surface.

Further, the lithium ion conductor may include one or a mixture of two or more selected from the group consisting of a lithium-lanthanum-zirconium oxide ($Li_7La_3Zr_2O_{12}$; LLZO)-based lithium ion conductor, a lithium-aluminum-germanium-phosphate ($Li_{1+x}Al_xGe_{2-x}(PO_4)_3$ (0≤x≤1); LAGP)-based lithium ion conductor such as $Li_{1.5}Al_{0.5}Ge_{1.5}(PO_4)_3$ or $Li_{1.3}Al_{0.3}Ge_{1.7}(PO_4)_3$, and a lithium-aluminumtitanium-phosphate ($Li_{1+x}Al_xTi_{2-x}(PO_4)_3$ (0≤x≤1); LATP)-based lithium ion conductor such as $Li_{1.3}Al_{0.3}Ti_{1.7}(PO_4)_3$.

The lithium ion conductor may be included in an amount of 5 wt % to 70 wt %, and specifically 20 wt % to 70 wt % based on the total weight of the solid polymer electrolyte.

Ion conductivity (o) of the solid polymer electrolyte of the present invention may be $1\times10^{-5}$ S/cm to $1\times10^{-4}$ S/cm at room temperature, that is, in a temperature range of 25° C. to 40° C.

Further, according to an embodiment of the present invention, there is provided a method of preparing a solid polymer electrolyte, which includes preparing a composition for a polymer electrolyte by dissolving the polymer represented by Formula 1, the lithium salt, and the lithium ion conductor in a solvent;

coating a film or an electrode surface with the composition for a polymer electrolyte; and drying and curing the composition for a polymer electrolyte.

The above-described solid polymer electrolyte of the present invention can be molded in the form of a free-standing type film or a coating film and used in an electrochemical device such as a lithium polymer secondary battery or the like.

Advantageous Effects

According to the present invention, when a polymer represented by the following Formula 1 and a lithium ion conductor are introduced in the preparation of a solid polymer electrolyte, crystallinity of the polymer can be controlled to attain a high ionic conductivity and a high electrochemical window (potential window) in a wide temperature range, and a solid polymer electrolyte having improved mechanical strength can also be prepared.

The above-described solid polymer electrolyte of the present invention is molded in the form of a film and used in an electrochemical device such as a lithium polymer secondary battery or the like, and thereby can improve electrochemical stability.

BEST MODE OF THE INVENTION

Figure 1:
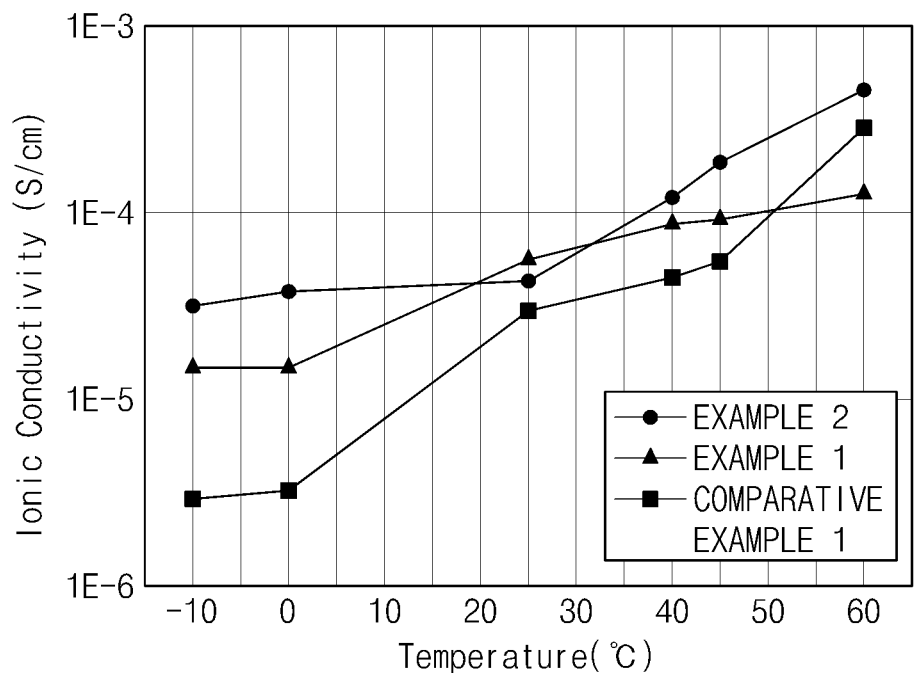
FIG. 1 is a graph showing a change in ion conductivity of a solid polymer electrolyte according to a change in temperature of Experimental Example 1 of the present invention.

Hereinafter, the present invention will be described in detail in order to facilitate understanding of the present invention.

It should be understood that the terms used in the specification and the appended claims should not be construed as limited to general and dictionary meanings, but interpreted based on the meanings and concepts corresponding to technical aspects of the present disclosure on the basis of the principle that the inventor is allowed to define terms appropriately for the best explanation.

In order to improve ionic conductivity at room temperature, various additives are introduced into a conventional polyethylene oxide-based solid polymer electrolyte to control the crystallinity of the polymer. However, while crystallinity is controlled when most of the additives are introduced, mechanical properties are degraded or resistance is increased. In addition, since the size of an additive itself affects chain mobility of a polymer matrix (network), there is a problem in that glass transition temperature (Tg), which is very important for improving ion conductivity at room temperature and low temperatures, may increase. The ion conductivity of the solid polymer electrolyte is determined by the crystallinity and glass transition temperature (Tg). For example, in the case of highly crystalline polymers, ion conductivity decreases due to orientation, and in the case of polymers with a high glass transition temperature, ion conductivity at low temperatures may be further reduced.

Therefore, in the present invention it was confirmed that, by introducing the polymer represented by Formula 1 and the lithium ion conductor as additives, ion conductivity and potential window of the solid polymer electrolyte at room temperature can be improved without increasing the resistance and glass transition temperature.

According to an embodiment of the present invention, there is provided a solid polymer electrolyte including a polymer represented by the following Formula 1; a lithium salt; and a lithium ion conductor.

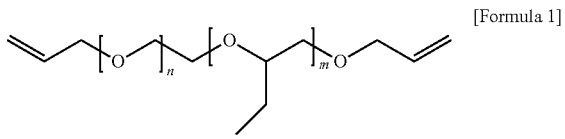

[Formula 1]

In Formula 1, n and m represent the number of moles of the repeating unit, and the molar ratio of n:m is in the range of 5:1 to 50:1, and specifically 20:1.

In the solid polymer electrolyte according to an embodiment of the present invention, the polymer represented by Formula 1 is a conductive polymer with polar groups capable of dissociating metal salts, and is coordinated with Li ions to achieve an effect of improving ion conductivity by including an element capable of providing electrons such as oxygen.

The weight average molecular weight (Mw) of the polymer represented by Formula 1 may be about 50,000 or more, specifically about 50,000 to 1,000,000, more specifically 50,000 to 500,000, and more specifically 50,000 to 200,000.

When the weight average molecular weight of the polymer is within the above-described range, the degree of polymerization of the polymer is controlled to be within a suitable range, and thus it is possible to attain a solid polymer electrolyte not only having improved ion conductivity and lithium cation transference number but also excellent mechanical strength and electrochemical stability. When the weight average molecular weight (Mw) of the polymer represented by Formula 1 is 50,000, which is a low molecular weight, the polymer is liquefied in the presence of lithium salts, and thus it may be difficult to prepare a solid polymer electrolyte.

Here, in the present specification, the term "weight average molecular weight (Mw)" may refer to a conversion value of a standard polyethylene oxide measured by a gel permeation chromatograph (GPC), and unless particularly indicated otherwise, a molecular weight may refer to a weight average molecular weight. For example, in the present invention, a measurement may be taken using an Agilent 4 Series for GPC, in which 100 μl of a sample is injected at a flow rate of 1.0 ml/min at 40° C. using Ultrahydrogel linear X2 columns and a 0.1M $NaNO_3$ (pH 7.0 phosphate buffer) eluent.

The polymer represented by Formula 1 may be included in an amount of 5 wt % to 60 wt %, and specifically 20 wt % to 60 wt % based on the total weight of the solid polymer electrolyte. When the content of the polymer represented by Formula 1 is less than 5 wt %, it is difficult to form a uniformly dispersed solid polymer electrolyte, and when the content is more than 60 wt %, ion conductivity may decrease.

Further, the solid polymer electrolyte may further include a copolymer as necessary.

The copolymer may be included in various ways such as grafting, crosslinking, or blending with the polymer represented by Formula 1 in the solid polymer electrolyte based on the polymer represented by Formula 1.

Representative examples of the copolymer include one or a mixture of two or more selected from the group consisting of styrene, polyvinylidene fluoride (PVDF), polypropylene oxide (PPO), polyacrylonitrile (PAN), polyvinyl chloride (PVC), polymethyl methacrylate (PMMA), polysiloxane, and polyphosphazene.

In the solid polymer electrolyte according to an embodiment of the present invention, the lithium salt may be dissociated by a conductive polymer to form a complex. For example, the lithium salt may serve to form a complex with an oxide group contained in the polymer represented by Formula 1 through coordination bonding and to conduct ions. Here, when the number of repeating units of the ethylene oxide group is increased, more ion conductive sites are supplied, and accordingly, the dissociation of lithium salts is increased so that more lithium free ions may be transferred.

As a representative example, the lithium salt may include $Li^+$ as a cation, and include any one selected from the group consisting of $F^-$, $Cl^-$, $Br^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2 N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2 N^-$ as an anion.

A single lithium salt or a combination of two or more may be used as necessary. The content of the lithium salt used may be suitably changed to be within a usable range, but the lithium salt may be included in an amount of 5 wt % to 20 wt %, specifically 10 to 30 wt %, and more specifically 10 wt % to 20 wt % based on the total weight of the solid polymer electrolyte in order to obtain an effect of forming an optimum anti-corrosive film on an electrode surface.

When the content of the lithium salt is less than 5 wt %, conductivity may be reduced due to the lack of lithium ions in the solid polymer electrolyte composition, and when the content is more than 20 wt %, viscosity increases and the ion conductivity decreases, resulting in a problem of cost increase.

Further, the ion conductivity of the solid polymer electrolyte of the present invention occurs in an amorphous region of the polymer represented by Formula 1. Therefore, in order to increase the ionic conductivity of the solid polymer electrolyte, the intermolecular interaction of the polymer represented by Formula 1, which is a crystalline polymer, needs to be inhibited such that the crystallinity thereof is lowered. To this end, additives may be introduced. However, in the method in which conventional additives are introduced, although the crystallinity of the polymer is controlled to increase ionic conductivity, mechanical properties deteriorate and resistance increases.

Thus, in the present invention, in order to alleviate these disadvantages, a lithium ion conductor capable of supplement a deficient salt dissociation ability of the polymer represented by Formula 1 and controlling the crystallinity of the solid conductive polymer is introduced as an additive of the solid polymer electrolyte such that sufficient space for moving lithium ions is formed, and thereby it is possible to realize a solid polymer electrolyte in which the ion conductivity is improved and mechanical properties are supplemented. Further, it also becomes possible to improve ion conductivity at low temperatures through a Li transfer channel formed of ceramics existing in the polymer.

The lithium ion conductor can be used without any particular limitation as long as it has lithium ion conductivity, and specifically, any one or a mixture of two or more of oxide-based, phosphate-based, nitride-based, and sulfide-based lithium ion conductors may be used. Representative examples of the lithium ion conductor include one or a mixture of two or more selected from the group consisting of a lithium-lanthanum-zirconium oxide ($Li_7La_3Zr_2O_{12}$; LLZO)-based lithium ion conductor with high ion conductivity (total $2.2 \times 10^{-4}$/cm), low reactivity with an electrode material, a wide potential window (0-6V), and the like (where the LLZO may be doped with one or more of Ta, Al, Si, Nb and HF), a lithium-aluminum-germanium-phosphate ($Li_{1+x}Al_xGe_{2-x}(PO_4)_3$ ($0 \leq x \leq 1$); LAGP)-based lithium ion conductor such as $Li_{1.5}Al_{0.5}Ge_{1.5}(PO_4)_3$ or $Li_{1.3}Al_{0.3}Ge_{1.7}(PO_4)_3$, and a lithium-aluminum-titanium-phosphate ($Li_{1+x}Al_xTi_{2-x}(PO_4)_3$ ($0 \leq x \leq 1$); LATP)-based lithium ion conductor such as $Li_{1.3}Al_{0.3}Ti_{1.7}(PO_4)_3$.

The lithium ion conductor may be included in an amount of 5 wt % to 70 wt %, and specifically 20 wt % to 70 wt % based on the total weight of the solid polymer electrolyte. When the content of the lithium ion conductor is less than 5 wt %, ion conductivity increase is insignificant. When the content is more than 70 wt %, ion conductivity of the solid polymer electrolyte reaches saturation and does not further increase, and there arises a problem of increased resistance and cost.

The lithium ion conductor may have an average particle size (D50) of 100 nm or more, and more preferably 200 nm to 700 nm. When the average particle size is less than 100 nm, the lithium ion conductors may aggregate, and it may be difficult to ensure mechanical properties of a solid electrolyte film. Further, when the average particle size is more than 700 nm, interface resistance is greatly increased and the lithium ion conductivity of the solid polymer electrolyte may be lowered due to reduction of specific surface area.

Here, the average particle size (D50) of the lithium ion conductor may be measured by a laser diffraction scattering method.

Further, the solid polymer electrolyte may optionally further include a binder polymer to improve the adhesion between the lithium ion conductors or between the solid polymer electrolyte and the electrode. The binder polymer may be used without any particular limitation as long as it is electrochemically stable.

Specifically, the binder polymer may be polyvinylidene fluoride-hexafluoropropylene, polyvinylidene fluoride-trichlorethylene, polymethyl methacrylate, polyacrylonitrile, polyvinylpyrrolidone, polyvinyl acetate, an ethylene vinyl acetate copolymer, cellulose acetate, cellulose acetate butyrate, cellulose acetate propionate, cyanoethyl polyvinyl alcohol, cyanoethylcellulose, carboxymethylcellulose, an acrylonitrile-styrene-butadiene copolymer, polyimide or the like, and one or a mixture of two or more thereof may be used.

Further, in addition to the lithium ion conductor, the solid polymer electrolyte of the present invention may further include, as necessary, other additives to ensure the effect of improving mechanical properties and reactivity, reducing resistance, and the like.

Representative examples of the additive include inorganic particles having an ability to transfer lithium ions, that is, lithium phosphate ($Li_3PO_4$), lithium titanium phosphate ($Li_cTi_d(PO_4)_3$, $0<c<2$, $0<d<3$), lithium aluminum titanium phosphate ($Li_{a1}Al_{b1}Ti_{c1}(PO_4)_3$, $0<a1<2$, $0<b1<1$, $0<c1<3$), lithium lanthanum titanate ($Li_{a3}La_{b3}TiO_3$, $0<a3<2$, $0<b3<3$), lithium germanium thiophosphates ($Li_{a4}Ge_{b4}P_{c2}S_d$, $0<a4<4$, $0<b4<1$, $0<c2<1$, $0<d<5$) such as $Li_{3.25}Ge_{0.25}P_{0.75}S_4$, lithium nitrides ($Li_{a5}N_{b5}$, $0<a5<4$, $0<b5<2$) such as $Li_3N$, a mixture thereof, etc.

The average particle size (D50) of the inorganic particles is preferably in the range of about 0.001 to 10 μm so as to have a suitable porosity in a uniform thickness in the solid polymer electrolyte. When the average particle size is less than 0.001 m, dispersibility may deteriorate. When the average particle size is more than 10 m, not only may the thickness of the porous coating layer increase, but also the inorganic particles may aggregate and be exposed to the outside of the solid polymer electrolyte, resulting in a decrease in mechanical strength.

Ion conductivity (σ) of the solid polymer electrolyte of the present invention may be $1 \times 10^{-5}$ S/cm to $1 \times 10^{-4}$ S/cm at room temperature, that is, in a temperature range of 25° C. to 40° C.

The ion conductivity may be measured in a frequency band of 100 MHz to 0.1 Hz after temperature stabilization in a chamber of 25° C. for 30 minutes by using VMP3 Multichannel potentiostat equipment and 4294A (manufactured by Biological Logic Science Instruments).

In the solid polymer electrolyte according to an embodiment of the present invention, by introducing a nanometer-sized lithium ion conductor into the polymer represented by Formula 1, the crystallinity of the polymer is reduced and an ion transfer channel is formed through the ceramic to improve ion conductivity at low temperature. Particularly, since a decrease in ion conductivity of the lithium ion conductor itself at a low temperature is less than that of the polymer, it is possible to improve lithium ion conductivity at a low temperature through forming a composite.

The solid polymer electrolyte according to an embodiment of the present invention may be electrochemically stable at a voltage range of 0 to 5.5 V, and specifically 0 to 4.3 V. The solid polymer electrolyte according to an embodiment may be used in an electrochemical device operated at a high voltage due to having an electrochemically stable and wide voltage window.

Further, according to an embodiment of the present invention, there is provided a method of preparing a solid polymer electrolyte, which includes preparing a composition for a polymer electrolyte by dissolving the polymer represented by Formula 1, the lithium salt, and the lithium ion conductor in a solvent;

coating a film or an electrode surface with the composition for a polymer electrolyte; and drying and curing the composition for a polymer electrolyte.

According to the method of the present invention, the lithium ion conductor and the lithium salt may be formed in the form of a complex which is uniformly dispersed in a polymer matrix (network) formed by a crosslinking reaction of the polymer represented by Formula 1. Therefore, the solid polymer electrolyte of the present invention can attain low crystallinity and high ion conductivity at a low temperature.

Further, in the above-described method, the solvent is not particularly limited, but organic solvents having high volatility such as THF, acetonitrile, and the like may be used.

The composition for a polymer electrolyte may selectively further include a polymerization initiator to form a polymer matrix.

Specifically, the polymerization initiator may include one selected from the group consisting of 1-hydroxy-cyclo-hexyl-phenyl-ketone, 2-methyl-1-[4-(methylthio) phenyl]-2-morpholinopropane-1-one, 1-hydroxy-2-methyl-1-phenyl-propan-1-one, 2-hydroxy-1-[4-(2-hydroxyethoxy) phenyl]-2-methyl-1-propanone, methyl benzoylformate, α,α-dimethoxy-alpha-phenylacetophenone, 2-benzyl-2-(di-methylamino)-1-[4-(4-morpholinyl) phenyl]-1-butanone, 2,2-dimethoxy-2-phenylacetophenone, and benzoin ethyl ether.

The polymerization initiator may be included in an amount of 0.01 to 5 parts by weight based on 100 parts by weight of the polymer represented by Formula 1.

Further, in the method of the present invention, known coating methods such as slot die, gravure coating, spin coating, spray coating, roll coating, curtain coating, extrusion, casting, screen printing, inkjet printing, and the like may be used as the coating method.

Further, in the method of the present invention, a method of curing the composition for a polymer electrolyte may be performed by inducing a crosslinking reaction while irradiating heat, e-beam, gamma ray, or UV (G, H, I-line) radiation or the like to a coated composition for a polymer electrolyte to vaporize a solvent at a temperature of 25° C. or more. That is, when the coated composition is irradiated with the heat, e-beam, gamma ray, or UV radiation or the like, a radical generated from the polymerization initiator acts as a catalyst to cause a crosslinking reaction between the polymers represented by Formula 1 to form a polymer matrix.

According to the method of the present invention, the solid polymer electrolyte may be prepared in the form of a free standing-type film having a thickness of 200 μm or less, for example 0.1 to 100 μm or 1 to 40 μm, and inserted between a positive electrode and a negative electrode, or may be prepared and introduced in the form of a coating film with which an electrode or a porous separator is coated.

Here, examples of the material of the porous separator include sheets or nonwoven fabrics formed of polyolefin-based polymers such as polyethylene, polypropylene, polytetrafluoroethylene (PTFE), polyvinylidene fluoride (PVDF), polymethyl methacrylate or polyethersulfone having chemical resistance and hydrophobicity, cellulose-based polymers, glass fiber, ceramic metal, etc.

The pore diameter of the porous separator is generally in the range of 0.01 to 10 μm and the thickness thereof is preferably in the range of 5 to 300 μm. When the pore diameter of the porous separator is less than 0.01 μm, efficiency may be greatly reduced, and when the pore diameter is more than 10 μm, the adsorption force of the polymer electrolyte composition increases and a permeation flow rate is reduced.

Further, the solid polymer electrolyte of the present invention is disposed on at least a part of the negative electrode or the positive electrode, and thereby positive or negative electrode surfaces can become electrochemically stabilized as they become mechanically stabilized. Particularly, the solid polymer electrolyte is completely coated on the surface of the negative electrode or positive electrode to serves as a protective film for preventing direct contact with the electrolyte having high reactivity, thereby enhancing chemical stability. For example, when the solid polymer electrolyte is formed on the negative electrode surface, the formation of dendrites on the negative electrode surface during charging and discharging of a lithium secondary battery may be suppressed and the interfacial stability between the negative electrode and the electrolyte is improved. Accordingly, cycle characteristics of the lithium secondary battery can be improved.

Further, the method of the present invention may also include a step of impregnating the lithium ion conductor in the formed polymer electrolyte.

Further, in the above-described method, the polymer electrolyte composition may also include an ion conductive electrolyte as necessary.

Further, the solid polymer electrolyte prepared by the method of the present invention may be used as an electrolyte for a lithium polymer secondary battery.

Specifically, a lithium secondary battery may be prepared by sequentially laminating the positive electrode, the solid polymer electrolyte of the present invention, and the negative electrode.

Here, the negative electrode or positive electrode forming the lithium secondary battery may be produced using conventional methods known in the related field. For example, an electrode slurry is prepared by mixing an electrode active material with a solvent, a binder, a conductive material and a dispersant as necessary and stirring, and then is applied onto a metal current collector, pressed, and dried to produce an electrode.

Specifically, as the positive electrode active material forming the positive electrode, a compound which can be applied to normal voltages or a high voltages, and can be capable of reversibly intercalating/deintercalating lithium may be used.

The positive electrode active material is a compound capable of reversibly intercalating and deintercalating lithium, and specifically, may include a lithium composite metal oxide including lithium and one or more metals such as cobalt, manganese, nickel, or aluminum. More specifically, examples of the lithium composite metal oxide include lithium-manganese-based oxides such as $LiMnO_2$, $LiMn_2O_4$ and the like, lithium-cobalt-based oxides such as $LiCoO_2$, lithium-nickel-based oxides such as $LiNiO_2$, lithium-nickel-manganese-based oxides such as $LiNi_{1-Y}Mn_YO_2$ (where $0<Y<1$), $LiMn_{2-z}Ni_zO_4$ (where $0<z<2$) and the like, lithium-nickel-cobalt-based oxides such as $LiNi_{1-Y1}Co_{Y1}O_2$ ($0<Y1<1$), $LiMn_{2-z1}Co_{z1}O_4$ ($0<Z<2$) and the like, lithium-manganese-cobalt-based oxides such as $LiCo_{1-Y2}Mn_{Y2}O_2$ ($0<Y2<1$), lithium-nickel-manganese-cobalt-based oxides such as $Li(Ni_pCo_qMn_{r1})O_2$ ($0<p<1$, $0<q<1$, $0<r1<1$, $p+q+r1=1$), $Li(Ni_{p1}CO_{q1}Mn_{r2})O_4$ ($0<p1<2$, $0<q1<2$, $0<r2<2$, $p1+q1+r2=2$), and the like, and oxides of lithium-nickel-cobalt-transition metal (M) such as $Li(Ni_{p2}Co_{q2}Mn_{r3}M_{s2})O_2$ (where M is selected from the group consisting of Al, Fe, V, Cr, Ti, Ta, Mg, and Mo, and p2, q2, r3, and s2 each independently represent atom fractions of elements, $0<p2<1$, $0<q2<1$, $0<r3<1$, $0<s2<1$, and $p2+q2+r3+s2=1$) and the like, and one or a mixture of two or more of these compounds may be included. Among these, in terms of improving the capacity characteristics and stability of the battery, the lithium transition metal oxide may be $LiCoO_2$, $LiMnO_2$, $LiNiO_2$, lithium nickel manganese cobalt oxides such as $Li(Ni_{0.6}Mn_{0.2}Co_{0.2})O_2$, $Li(Ni_{0.5}Mn_{0.3}Co_{0.2})O_2$, $Li(Ni_{0.5}Mn_{0.1}Co_{0.1})O_2$, and the like, lithium nickel cobalt aluminum-based oxides such as such as $Li(Ni_{0.5}Co_{0.15}Al_{0.05})O_2$ and the like. Considering the remarkable improvement that results from controlling the type and content ratio of the constituent elements forming the lithium composite metal oxide, the lithium composite metal oxide may be $Li(Ni_{0.6}Mn_{0.2}Co_{0.2})O_2$, $Li(Ni_{0.5}Mn_{0.3}Co_{0.2})O_2$, $Li(Ni_{0.7}Mn_{0.15}Co_{0.15})O_2$, $L(iNi_{0.5}Mn_{0.1}Co_{0.1})O_2$, or the like, and one or a mixture of two or more thereof may be used.

The positive electrode active material may be included in an amount of 80 wt % to 99 wt % based on the total weight of solids in the positive electrode slurry.

The conductive material is generally included in an amount of 1 wt % to 30 wt % based on the total weight of solids in the positive electrode slurry.

Any conductive material may be used without particular limitation so long as it has suitable conductivity without causing adverse chemical changes in the battery. Examples of suitable conductive materials include graphite; carbon-based materials such as carbon black, acetylene black, Ketjen black, channel black, furnace black, lamp black, and thermal black; conductive fibers such as carbon fibers and metallic fibers; metallic powders such as carbon fluoride powders, aluminum powders, and nickel powders; conductive whiskers such as zinc oxide and potassium titanate; conductive metal oxides such as titanium oxide; and polyphenylene derivatives. Specific examples of commercially available conductive materials may include various acetylene black products (available from Chevron Chemical Company), Denka Black (available from Denka Singapore Private Limited), products available from Gulf Oil Company, Ketjen black, the EC series (available from Armak Company), Vulcan XC-72 (available from Cabot Company), Super P (available from Timcal Co., Ltd.), and the like.

The binder s a component that assists in the binding between the active material and the conductive agent and in the binding with the current collector, and generally included in an amount of 1 to 30 wt % based on the total weight of solids in the positive electrode slurry. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene propylene diene polymer (EPDM), a sulfonated EPDM, a styrene butadiene rubber, a fluororubber, various copolymers thereof, etc.

The solvent may include an organic solvent such as N-methyl-2-pyrrolidone (NMP), and may be used in an amount in which a preferable viscosity is obtained when the positive electrode active material, and optionally the binder and the conductive material, are included. For example, the solvent may be included such that the solid content of the solvent is in the range of 50 wt % to 95 wt %, and preferably 70 wt % to 90 wt %, in a slurry including the positive electrode active material and optionally the binder and the conductive material.

Further, the negative electrode active material forming the negative electrode may be a conventional negative electrode active material that may be used for a negative electrode of a conventional electrochemical device, and examples thereof are not particularly limited. As representative examples of the negative electrode materials that may be used, lithium titanium oxide (LTO); carbon such as non-graphitized carbon and graphitized carbon; $Li_xFe_2O_3$ ($0 \leq x \leq 1$), $Li_xWO_2$ ($0 \leq x \leq 1$), a lithium metal; lithium alloys;

silicon-based alloys; tin-based alloys; metal oxides such as SnO, $SnO_2$, PbO, $PbO_2$, $Pb_2O_3$, $Pb_3O_4$, $Sb_2O_3$, $Sb_2O_4$, $Sb_2O_5$, GeO, $GeO_2$, $Bi_2O_3$, $Bi_2O_4$, and $Bi_2O_5$; conductive polymers such as polyacetylene; LiCo—Ni based materials; titanium oxides; and the like may be used at the same time.

In addition, a metal oxide such as $TiO_2$, $SnO_2$, and the like that may intercalate and deintercalate lithium and has a potential less than 2V with respect to lithium may be used, but the present invention is not limited thereto. Particularly, a carbon material such as graphite, a carbon fiber, active carbon, and the like may be preferably used.

The negative electrode active material may be included in an amount of 80 wt % to 99 wt % based on the total weight of solids in the negative electrode slurry.

The binder s a component that assists in the binding between the active material and the conductive agent and in the binding with the current collector, and generally included in an amount of 1 to 30 wt % based on the total weight of solids in the negative electrode slurry. Examples of the binder include polyvinylidene fluoride (PVDF), polyvinyl alcohol, carboxymethylcellulose (CMC), starch, hydroxypropylcellulose, regenerated cellulose, polyvinyl pyrrolidone, tetrafluoroethylene, polyethylene, polypropylene, an ethylene propylene diene terpolymer (EPDM), a sulfonated EPDM, a styrene butadiene rubber, fluororubbers, various copolymers, etc.

The conductive material is a component for further improving the conductivity of the negative electrode active material, and is commonly added in an amount of 1 to 20 wt % by weight based on the total weight of solids in the negative electrode slurry. Any conductive material may be used without particular limitation as long as suitable conductivity is provided without causing chemical changes in the battery. Examples of the conductive material include graphite such as natural or artificial graphite; carbon blacks such as acetylene black, Ketjen black, channel black, furnace black, lamp black, and thermal black; conductive fibers such as carbon fibers and metallic fibers; metallic powders such as carbon fluoride, aluminum, and nickel powders; conductive whiskers such as zinc oxide and potassium titanate whiskers; conductive metal oxides such as titanium oxide; and polyphenylene derivatives.

The solvent may include water or an organic solvent such as NMP, an alcohol, and the like, and may be used in an amount in which a preferable viscosity is obtained when the negative electrode active material, and optionally the binder and the conductive material, are included. For example, the solvent may be included in an amount such that the solid content of the solvent is in the range of 50 wt % to 95 wt %, and preferably 70 wt % to 90 wt %, in a slurry including the negative electrode active material and optionally the binder and the conductive material.

The current collector is a metal having high conductivity and a metal to which the slurry of the electrode active material may easily adhere. Any metals may be used as long as the metal has no reactivity in a voltage range of a battery. Specifically, examples of a positive electrode collector include aluminum, nickel, or a foil formed by the combination thereof, and non-limiting examples of a negative electrode collector may include copper, gold, nickel, a copper alloy, or a foil formed by the combination thereof.

Further, a separator may be present between the positive electrode and the negative electrode depending on the type of the lithium secondary battery. As such a separator, a conventional porous polymer film, that is, polyethylene, polypropylene, polyvinylidene fluoride, or a multilayer film of two or more thereof may be used, and a mixed multilayer film such as a polyethylene/polypropylene double layered separator, a polyethylene/polypropylene/polyethylene triple layered separator, a polypropylene/polyethylene/polypropylene triple layered separator, and the like may be used. Further, conventional nonwoven fabrics, for example, nonwoven fabrics formed of glass fibers with a high melting point, polyethylene terephthalate fibers, and the like may be used, but the present invention is not limited thereto.

MODES OF THE INVENTION

Hereinafter, the present invention will be described in detail through specific examples. However, the description proposed herein is just a preferable example for the purpose of illustrations only, not intended to limit the scope of the invention, so it should be understood that the examples are provided for a more definite explanation to an ordinary person skilled in the art.

EXAMPLES

Example 1

35 g of a polymer represented by Formula 1 having a weight average molecular weight of 100,000 (the molar ratio of n:m was 20:1), 55 g of lithium-lanthanum-zirconium oxide ($Li_7La_3Zr_2O_{12}$; LLZO) having an average particle size of 300 nm as a lithium ion conductor, and 10 g of lithium salts (LiTFSI) were dissolved in acetonitrile. 0.7 g of methylbenzoylformate was added thereto as a polymerization initiator to prepare a composition for a polymer electrolyte having a solid content of 40%.

Subsequently, a film was coated with the composition for a polymer electrolyte, and then the composition was vaporized at 40° C. to form a film and then irradiated with UV to prepare a solid polymer electrolyte film having a thickness of 30 μm.

Example 2

A solid polymer electrolyte film was prepared in the same manner as in Example 1 except that lithium-aluminum-germanium-phosphate ($Li_{1.3}Al_{0.3}Ge_{1.7}(PO_4)_3$; LAGP) having an average particle size of 300 nm was mixed instead of LLZO.

Comparative Example 1

A solid polymer electrolyte film was prepared in the same manner as in Example 1 except that the lithium ion conductor was not included, and 80 g of the polymer represented by Formula 1 having a weight-average molecular weight of 100,000 and 20 g of the lithium salts (LiTFSI) were mixed.

EXPERIMENTAL EXAMPLE

Experimental Example 1. Ion Conductivity Measurement

The results of measuring ionic conductivity of each of the solid polymer electrolyte films according to Examples 1 and 2 and Comparative Example 1 are shown in FIG. 1.

The ion conductivity was measured using an alternating current impedance measurement method according to temperature after a gold (Au) electrode in the form of a circle with a 1 mm diameter was coated using a sputtering method on the upper parts of the solid electrolyte films prepared in Examples 1 and 2 and Comparative Example 1. The ion conductivity was measured using VMP3 and 4294A measuring instrument and at a frequency band of 100 MHz to 0.1 Hz.

Referring to change in ion conductivity according to temperature of the solid polymer electrolyte films prepared in Examples 1 and 2 and Comparative Example 1 as shown in FIG. 1, it can be seen that, while the solid polymer electrolyte films prepared in Examples 1 and 2 including lithium ion conductors have an ion conductivity of $1.0 \times 10^{-5}$ S/cm or more in a temperature range of 25° C. or less, the solid polymer electrolyte film prepared in Comparative Example 1 has a low ion conductivity of $5.0 \times 10^{-6}$ S/cm or less in a temperature range of 25° C. or less.

Accordingly, it can be seen from these results that the solid polymer electrolyte film proposed in the present invention has an effect of increasing lithium ion conductivity not only at room temperature but also at low temperature.

Experimental Example 2. Potential Window Measurement

Figure 2:
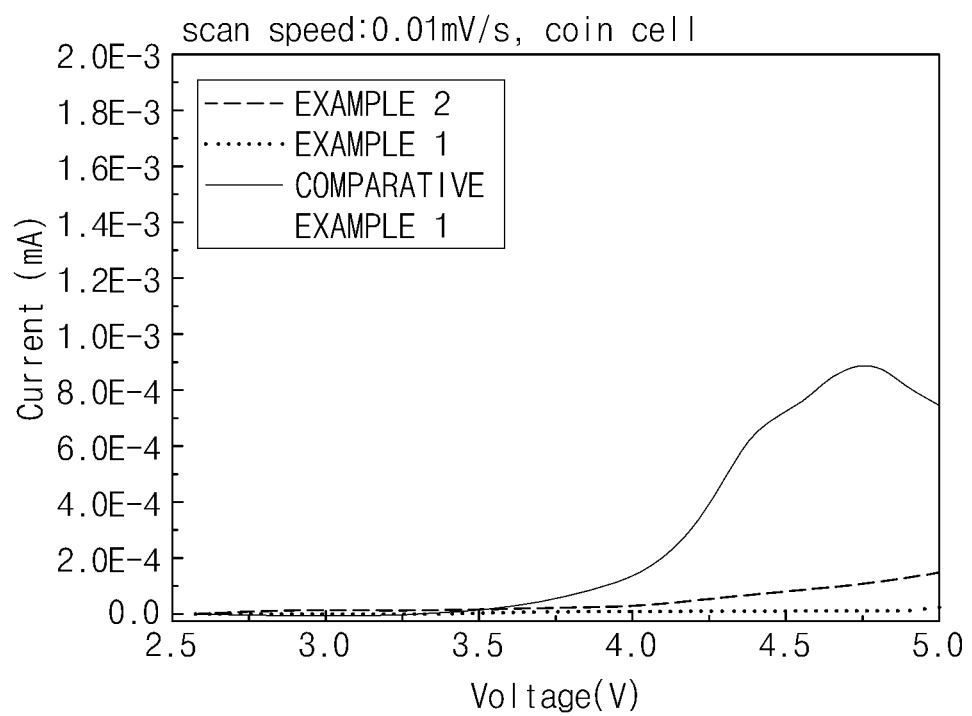
FIG. 2 is a graph showing potential window characteristics of a solid polymer electrolyte according to Experimental Example 2 of the present invention.

The potential window of the solid polymer electrolyte films prepared according to Examples 1 and 2 and Comparative Example 1 were measured using an LSV method under the same conditions as in Experimental Example 1, and the results are shown in FIG. 2.

For example, the potential window was measured using a potentiostat after forming a solid polymer electrolyte film and setting Li metal as a reference electrode. The measurement was carried out at a rate of 1 mV/sec at room temperature.

As shown in FIG. 2, it can be seen that, in the case of the electrolytes of Examples 1 and 2, the redox reaction occurred at 4.0V or higher due to the improvement of the potential window through compounding while the polymer (PEO-based polymer electrolyte) of Comparative Example 1 observed low oxidation stability at 4.0V or less, thereby cannot be used in a battery of 4.0V or more. Therefore, it can be predicted that the electrolytes can be used in a high voltage battery.

The invention claimed is:

1. A solid polymer electrolyte, comprising:
a polymer represented by the following Formula 1;
a lithium salt; and
a lithium ion conductor,

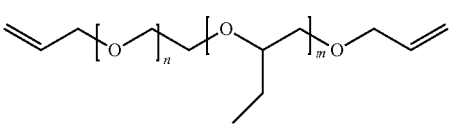

[Formula 1]

in Formula 1,
n and m represent the number of moles of a repeating unit, and
a molar ratio of n:m is in a range of 5:1 to 50:1,
wherein the lithium ion conductor includes at least one selected from lithium-lanthanum-zirconium oxide-based, or lithium-aluminum-germanium-phosphate-based lithium ion conductors.

2. The solid polymer electrolyte according to claim 1, wherein a weight average molecular weight of the polymer is in a range of 50,000 to 5,000,000.

3. The solid polymer electrolyte according to claim 1, wherein a weight average molecular weight of the polymer is in a range of 50,000 to 500,000.

4. The solid polymer electrolyte according to claim 1, wherein a weight average molecular weight of the polymer is in a range of 50,000 to 200,000.

5. The solid polymer electrolyte according to claim 1, wherein the polymer is included in an amount of 5 wt % to 60 wt % based on a total weight of the solid polymer electrolyte.

6. The solid polymer electrolyte according to claim 1, wherein the polymer is included in an amount of 20 wt % to 60 wt % based on a total weight of the solid polymer electrolyte.

7. The solid polymer electrolyte according to claim 1, wherein the lithium salt includes $Li^+$ as a cation, and includes any one selected from the group consisting of $F^-$, $Cl^-$, $BP^-$, $I^-$, $NO_3^-$, $N(CN)_2^-$, $BF_4^-$, $ClO_4^-$, $AlO_4^-$, $AlCl_4^-$, $PF_6^-$, $SbF_6^-$, $AsF_6^-$, $BF_2C_2O_4^-$, $BC_4O_8^-$, $(CF_3)_2PF_4^-$, $(CF_3)_3PF_3^-$, $(CF_3)_4PF_2^-$, $(CF_3)_5PF^-$, $(CF_3)_6P^-$, $CF_3SO_3^-$, $C_4F_9SO_3^-$, $CF_3CF_2SO_3^-$, $(CF_3SO_2)_2N^-$, $(F_2SO_2)_2N^-$, $CF_3CF_2(CF_3)_2CO^-$, $(CF_3SO_2)_2CH^-$, $CF_3(CF_2)_7SO_3^-$, $CF_3CO_2^-$, $CH_3CO_2^-$, $SCN^-$, and $(CF_3CF_2SO_2)_2N^-$ as an anion.

8. The solid polymer electrolyte according to claim 1, wherein the lithium salt is included in an amount of 5 wt % to 20 wt % based on the total weight of the solid polymer electrolyte.

9. The solid polymer electrolyte according to claim 1, wherein the lithium ion conductor includes one or a mixture of two or more selected from the group consisting of $Li_7La_3Zr_2O_{12}$(LLZO), $Li_{1.5}Al_{0.5}Ge_{1.5}(PO_4)_3$, and $Li_{1.3}Al_{0.3}Ge_{1.7}(PO_4)_3$.

10. The solid polymer electrolyte according to claim 1, wherein the lithium ion conductor is included in an amount of 5 wt % to 70 wt % based on the total weight of the solid polymer electrolyte.

11. The solid polymer electrolyte according to claim 1, wherein the lithium ion conductor is included in an amount of 20 wt % to 70 wt % based on the total weight of the solid polymer electrolyte.

12. The solid polymer electrolyte according to claim 1, wherein the solid polymer electrolyte is an electrolyte for a lithium secondary battery.

13. A method of preparing the solid polymer electrolyte of claim 1, comprising:
preparing a composition for a polymer electrolyte by dissolving a polymer represented by the following Formula 1, a lithium salt, and a lithium ion conductor in a solvent;
coating a film or an electrode surface with the composition for a polymer electrolyte; and
drying and curing the composition for a polymer electrolyte,

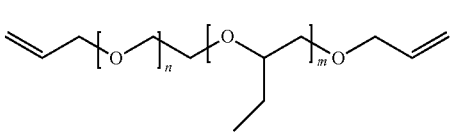

[Formula 1]

in Formula 1,
n and m represent the number of moles of a repeating unit, and a molar ratio of n:m is in a range of 5:1 to 50:1,
wherein the lithium ion conductor includes at least one selected from lithium-lanthanum-zirconium oxide-based, or lithium-aluminum-germanium-phosphate-based lithium ion conductors.

14. The method according to claim $14$, wherein the solid polymer electrolyte is prepared in the form of a free-standing type film or a coating film.

* * * * *